March 17, 1936.    J. BAYER    2,034,554
PRODUCTION OF OLEUM
Filed May 22, 1935
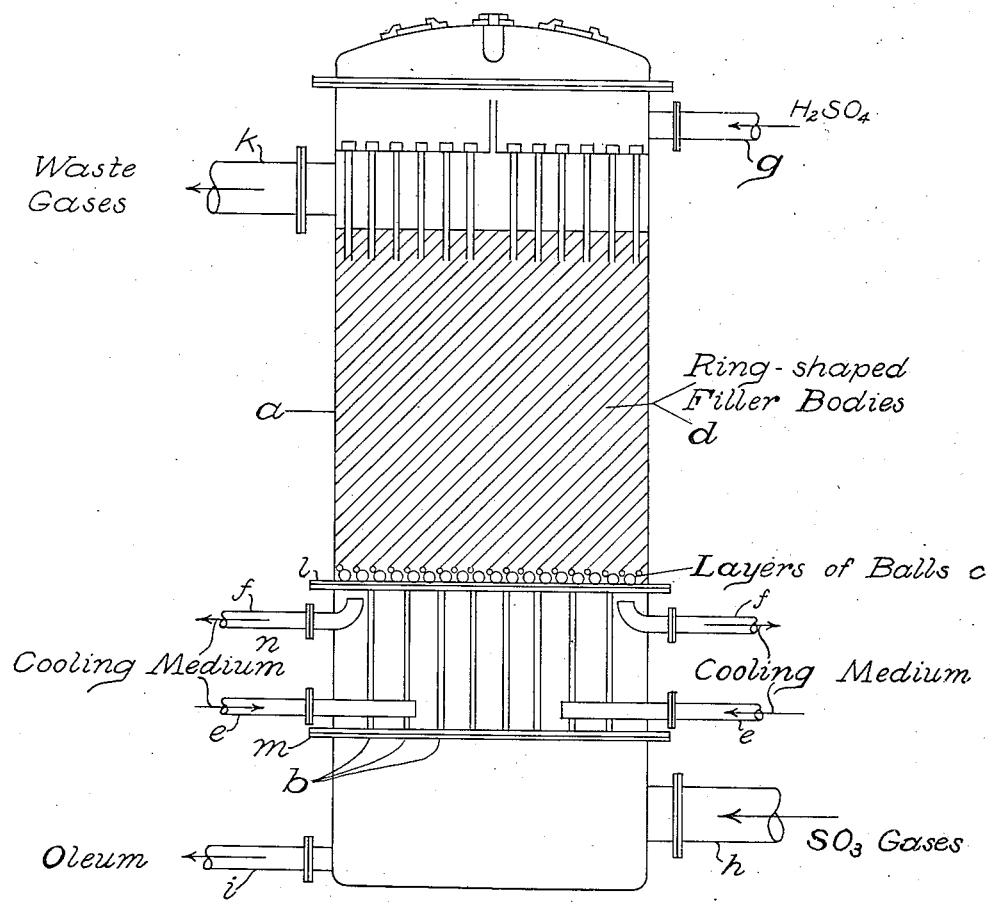
INVENTOR
Josef Bayer
BY
ATTORNEY Patented Mar. 17, 1936

2,034,554

UNITED STATES PATENT OFFICE 2,034,554

PRODUCTION OF OLEUM

Josef Bayer, Ludwigshafen-on-the-Rhine, Germany, assignor to I. G. Farbenindustrie Aktiengesellschaft, Frankfort-on-the-Main, Germany Application May 22, 1935, Serial No. 22,691
In Germany May 24, 1934

7 Claims. (Cl. 23—170)

The present invention relates to a process of producing oleum and an apparatus therefor.

It has already been proposed to employ trickling towers with internal cooling for the purpose of preparing oleum by the absorption of sulphur trioxide in sulphuric acid. The sulphur trioxide can be made from sulphur dioxide by means of catalytic oxidation. The processes hitherto used have the drawbacks, however, that the cooling devices employed, in particular the cooling spirals, restrict the cross-section of the tower and are exposed to corrosion.

According to this invention the said drawbacks are avoided.

I have now found that in the preparation of oleum by the absorption of sulphur trioxide in sulphuric acid great advantages are obtained by contacting the sulphuric acid with gases comprising sulphur trioxide, at first without cooling and finally when cooling by contact with the inner surfaces of a bundle of vertical cooled tubes. This may be performed by providing below the absorption chamber, which may be provided in known manner with means for finely dividing the sulphuric acid, e. g. filler bodies, such as rings, bricks or balls, a cooling device consisting of a bundle of tubes the longitudinal axes of which are vertical, through which tubes the liquid to be cooled flows while the cooling agent, as for example water or brine, surrounds the tubes externally. The bundle of tubes offers to the gas to be absorbed a smaller resistance than the cross-section of the tower filled with filler bodies. The absorption process according to this invention, contrasted with the processes which employ cooling elements which restrict the cross-section, offers the advantage of a considerably greater loading capacity. It is preferable to introduce the gas laden with sulphur trioxide below the cooling element, for example below it because by this arrangement particularly high concentrations of oleum can be obtained. This method of working is illustrated by way of example in the accompanying drawing.

The absorption tower $a$ contains in its lower part the bundle of vertical tubes $b$ inserted in the false bottoms $m$ and $l$ and thereover a high column of ring-shaped filler bodies $d$, resting on some layers of balls $c$. The liquid cooling the tubes $b$ enters the cooling chamber $n$ formed between the false bottoms $l$ and $m$ by means of the tubes $e$ and leaves it through $f$.

The sulphuric acid entering through $g$ passes the column of filler bodies $d$ and $c$ and the bundle of tubes $b$ and when doing so it absorbs the sulphur trioxide from the counterstreaming gases containing the same introduced through $h$. The oleum formed leaves the tower through $i$ while the waste gases are led off through $k$.

A further advantage of the process according to this invention consists in the fact that by reason of the rapid speed of flow of the oleum in the vertical bundle of tubes at its critical concentration, there is a much smaller tendency for the oleum to solidify than in the known processes having coolers arranged outside the tower in which the oleum readily solidifies by reason of the unavoidable horizontal and curved guides, especially when operation is interrupted.

With internally cooled towers according to this invention it is possible to obtain concentrations of oleum which are practically unattainable with the known apparatus.

Since the tower and the surfaces of the supporting grate for the filler bodies can be lined with ceramic material, the oleum, in the modification of the apparatus shown in the drawing, only comes into contact with metallic apparatus or tube material when the sulphur trioxide content of the oleum is already so high that attack on the metal no longer takes place. Consequently repairs by reason of attack by acid or oleum are practically eliminated.

Attack on the cooling tubes by the cooling agent, in cases when specially stable metal is not provided at the start, is avoided by circulating through the cooling system water to which has been added a sufficient amount of an agent protecting against corrosion or a suitable cooling brine and inserting a special regulating cooler in the cycle of the cooling agent. The secondary cooling with the available water which usually has corrosive properties is thus transferred to a cooling system outside the absorption tower and readily accessible for carrying out repairs.

Furthermore there is the advantage that the corrosive effect of the used water is considerably weaker in the secondary cooling system by reason of the substantially lower temperature prevailing therein.

What I claim is:—

1. Process for the production of oleum by the absorption of sulphur trioxide in sulphuric acid which consists in contacting the sulphuric acid with gases comprising sulphur trioxide at first without cooling and finally when cooling by contact with the inner surfaces of a bundle of vertical cooled tubes.

2. Process for the production of oleum by the absorption of sulphur trioxide in sulphuric acid which consists in contacting finely distributed sulphuric acid while moving downwards with counter-streaming gases comprising sulphur trioxide at first without cooling and finally when cooling in the same reaction vessel by contact with the inner surfaces of a bundle of vertical cooled tubes.

3. Process for the production of oleum by the absorption of sulphur trioxide in sulphuric acid which consists in making the sulphuric acid trickle through a layer of filler bodies and then flow through a bundle of externally cooled vertical tubes, contacting it on its way with counter-streaming gases comprising sulphur trioxide, sulphur trioxide thus being dissolved in the sulphuric acid and leading off the oleum thus obtained.

4. Absorption tower for the production of oleum comprising means for introducing sulphuric acid, means for withdrawing the oleum formed and for withdrawing waste gases, an absorption chamber provided with means for finely distributing the sulphuric acid and below that absorption chamber a cooling chamber comprising a bundle of vertical tubes inserted in false bottoms, means for externally cooling these tubes and means for introducing gases containing sulphur trioxide into the tower below said bundle of tubes.

5. Absorption tower for the production of oleum comprising means for introducing sulphuric acid, means for withdrawing the oleum formed and for withdrawing waste gases, an absorption chamber filled with filler bodies for finely distributing the sulphuric acid and below that absorption chamber a cooling chamber comprising a bundle of vertical tubes inserted in false bottoms, means for externally cooling these tubes and means for introducing gases containing sulphur trioxide into the tower below said bundle of tubes.

6. Absorption tower according to claim 4 in which the surfaces of the parts exposed to corrosion by sulphuric acid containing dissolved sulphur trioxide with the exception of the bundle of tubes are made of ceramic material.

7. Absorption tower according to claim 5 in which the surfaces of the absorption chamber, the filler bodies and the surfaces of the upper false bottom bearing the bundle of cooled tubes are made of ceramic material.

JOSEF BAYER.